(12) United States Patent
Stracuzzi et al.

(10) Patent No.: US 10,859,721 B2
(45) Date of Patent: Dec. 8, 2020

(54) METHOD FOR ENHANCING A COMPUTER TO ESTIMATE AN UNCERTAINTY OF AN ONSET OF A SIGNAL OF INTEREST IN TIME-SERIES NOISY DATA

(71) Applicant: National Technology & Engineering Solutions of Sandia, LLC, Albuquerque, NM (US)

(72) Inventors: David John Stracuzzi, Albuquerque, NM (US); Matthew Gregor Peterson, Albuquerque, NM (US); Charles Theodore Vollmer, Fort Collins, CO (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 368 days.

(21) Appl. No.: 15/885,255

(22) Filed: Jan. 31, 2018

(65) Prior Publication Data

US 2019/0235105 A1 Aug. 1, 2019

(51) Int. Cl.
*G01V 1/28* (2006.01)
*G01V 1/36* (2006.01)
(Continued)

(52) U.S. Cl.
CPC .............. *G01V 1/282* (2013.01); *G01V 1/366* (2013.01); *G06K 9/0053* (2013.01);
(Continued)

(58) Field of Classification Search
CPC .......... G01V 2210/30; G01V 2210/32; G01V 2210/61; G01V 2210/667; G06K 9/0053;
(Continued)

(56) References Cited

U.S. PATENT DOCUMENTS

| | | | | |
|---|---|---|---|---|
| 10,110,976 B2 * | 10/2018 | Bell | ...................... | G06N 20/00 |
| 2011/0184303 A1 * | 7/2011 | Skinner | .................. | A61B 5/087 |
| | | | | 600/529 |
| 2014/0149273 A1 * | 5/2014 | Angell | .................. | G06Q 40/04 |
| | | | | 705/37 |

OTHER PUBLICATIONS

Vollmer et al., "Using Data-Driven Uncertainty Quantification to Support Decision Making", Sandia National Laboratories (2017), SAND2017-6784C., 12 pages.
(Continued)

*Primary Examiner* — Elias Desta
(74) *Attorney, Agent, or Firm* — Yee & Associates, P.C.

(57) ABSTRACT

A computer-implemented method of enhancing a computer to estimate an uncertainty of an onset of a signal of interest in time-series noisy data. A first mathematical model of first time series data that contains only noise is calculated. A second mathematical model of second time series data that contains the noise and an onset of a signal of interest in the second time series data is calculated. A difference is evaluated between a first combination, being the first mathematical model and the second mathematical model, and a second combination, being the first time series data and the second time series data, wherein evaluating is performed using a generalized entropy metric. A specific time when an onset of the signal of interest occurs is estimated from the difference. An "a posteriori" distribution is derived for an uncertainty of the specific time at which the onset occurs.

20 Claims, 5 Drawing Sheets

(51) Int. Cl.
*G06K 9/62* (2006.01)
*G06N 7/00* (2006.01)
*G06K 9/00* (2006.01)
*G06K 9/52* (2006.01)

(52) U.S. Cl.
CPC ......... *G06K 9/0055* (2013.01); *G06K 9/6268* (2013.01); *G06N 7/005* (2013.01); *G01V 2210/30* (2013.01); *G01V 2210/612* (2013.01); *G01V 2210/667* (2013.01); *G06K 9/52* (2013.01)

(58) Field of Classification Search
CPC ...... G06K 9/0055; G06K 9/52; G06K 9/6268; G06N 20/10; G06N 20/20; G06N 3/08; G06N 7/005

See application file for complete search history.

(56) References Cited

OTHER PUBLICATIONS

Akaike, H., "A New Look at Statistical Model Identification", IEEE Transactions on Automatic Control (1974), vol. 19, pp. 716-723.

O'Neel, S. et al., "Seismic Detection and Analysis of Icequakes at Columbia Glacier, Alaska", Journal of Geophysical Research (2007), F03S23, vol. 112, 14 pages.

Ringdal, F. and Husebye, E.S., "Application of Arrays in the Detection, Location, and Identification of Seismic Events", Bulletin of the Seismological Society of America (1982), vol. 72, 6B, pp. S201-S224.

Rodriguez, I. V. "Automatic Time-Picking of Microseismic Data Combining STA/LTA and the Stationary Discrete Wavelet Transform" (2011), Recovery—CSPG CSEG CWLS Convention, 4 pages.

Stump, B. W. and Pearson, D. C., "Regional Observations of Mining Blasts by the GSETT-3 Seismic Monitoring System", Tech. Rep. LA-UR-96/3634 (1996), Los Alamos National Laboratories, 10 pages.

Trifunac, M. D. and Brady, A. G., "A study on the Duration of Strong Earthquake Ground Motion", Bulletin of the Seismological Society of America (1975), vol. 65, pp. 581-626.

Velasco, A. et al., "Uncertainty in Phase Arrival Time Picks for Regional Seismic Events: An Experimental Design", LA-UR-01-0747 (2001), Los Alamos National Laboratory for the US Department of Energy, 16 pages.

Werner-Allen, G. et al., "Monitoring Volcanic Eruptions with a Wireless Sensor Network", Proceedings of the Second European Workshop on Wireless Sensor Networks (2005), pp. 108-120.

Zeiler, C. and Velasco, A. Seismogram Picking Error from Analyst review (SPEAR): Single-Analyst and Institution Analysis, Bulletin of the Seismological Society of America (2009), vol. 99, pp. 2759-2770.

\* cited by examiner

METHOD FOR ENHANCING A COMPUTER TO ESTIMATE AN UNCERTAINTY OF AN ONSET OF A SIGNAL OF INTEREST IN TIME-SERIES NOISY DATA

GOVERNMENT LICENSE RIGHTS

This invention was made with U.S. Government support under Contract No. DE-NA0003525 between National Technology & Engineering Solutions of Sandia, LLC and the United States Department of Energy/National Nuclear Security Administration. The United States Government has certain rights in this invention.

BACKGROUND INFORMATION

1. Field

The present disclosure relates to a method for enhancing a computer to estimate an uncertainty of an onset of a signal of interest in time-series noisy data.

2. Background

In some scientific endeavors, a difficulty that is encountered is detecting a signal that is small relative to surrounding noise. For example, a seismograph is used to detect waves propagating through the Earth. The signals of interest are caused by earthquakes. However, the seismograph also produces other signals which are considered to be noise from a wide variety of choices. When a signal caused by an earthquake first arrives at the seismograph, the signal at that specific moment in time may be very small compared to the noise. However, this onset signal is of interest to scientists, and thus it is desirable to be as precise as possible as to when the onset signal first appears.

A similar problem may arise in other kinds of time-series data in which detecting the onset of a signal is desirable. For example, the monitoring and detection of chemical or biologic agents in a given environment may be of interest. Many other applications are also of interest.

SUMMARY

The illustrative embodiments provide for a computer-implemented method of enhancing a computer to estimate an uncertainty of an onset of a signal of interest in time-series noisy data. The computer-implemented method includes calculating, using a processor, a first mathematical model of first time series data that contains only noise. The computer-implemented method also includes calculating, using the processor, a second mathematical model of second time series data that contains the noise and an onset of a signal of interest in the second time series data. The computer-implemented method also includes evaluating, using the processor, a difference between a first combination, comprising the first mathematical model and the second mathematical model, and a second combination, comprising the first time series data and the second time series data. Evaluating is performed using a generalized entropy metric. The computer-implemented method also includes estimating from the difference, using the processor, a specific time when an onset of the signal of interest occurs. The computer-implemented method also includes deriving, using the processor, an "a posteriori" distribution for an uncertainty of the specific time at which the onset occurs.

The illustrative embodiments also contemplate a computer including a processor and a computer usable program code storing program code which, when executed by the processor, performs the above computer-implemented method. The illustrative embodiments also contemplate a non-transitory computer recordable storage medium storing such program code. Other illustrative embodiments are also possible, as described elsewhere herein.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
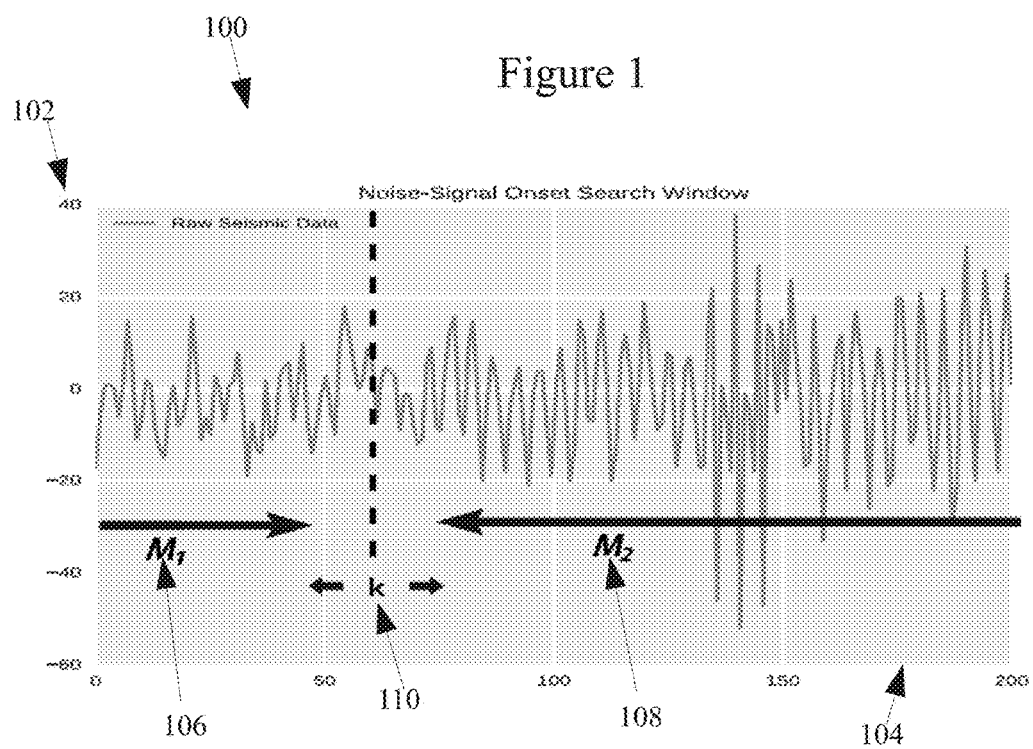
FIG. 1 illustrates a graph showing a sliding window for estimating an arrival time of a signal in time series data, in accordance with an illustrative embodiment.

The illustrative embodiments recognize and take into account that as data collection and analysis methods become increasingly sophisticated, interpretation and use of results by end users becomes increasingly challenging. Thus, the illustrative embodiments address the role of data-driven uncertainty quantification in supporting and improving decision-making. The illustrative embodiments are illustrated with a case study in seismic onset detection, comparing statistically computed distributions over possible signal onset times to the onset times chosen by a set of domain analysts. The illustrative embodiments are capable of estimating uncertainty distributions that can identify subtle changes in the seismic waveform that are missed by both point estimate calculations and by domain analysts.

Note that while the illustrative embodiments are described in the context of seismology, the illustrative embodiments are applicable to any time series data analysis in which determining the uncertainty of an onset signal is desirable. Thus, for example, the illustrative embodiments could be applied to data monitoring, chemical and biological agent monitoring, physical event monitoring such as changes in solar output, monitoring for computer-related events such as the onset of a series of messages such as in the case of a denial of service attack, and even in intelligence settings such as monitoring for changes in an adversary's activity.

I. INTRODUCTION

The illustrative embodiments also recognize and take into account that data science continues to emerge as an interdisciplinary field concerned with data acquisition, storage, curation, and analysis. Thus, the illustrative embodiments provide for collecting and analyzing data to provide new information to a decision-making process. The illustrative embodiments may be used especially in situations in which ground truth or supervision are unavailable, precise judgements are important, and data do not easily yield to simple inspection or point estimate solutions.

As indicated above, one out of many possible applications is seismology. An example of the illustrative embodiments is now provided in the context of seismology, in which the goal is to detect the onset of a signal, called the pick, in a single seismogram. Seismic picking is usually done by a combination of automated analysis, which identifies candidate onset times, and human analysts, who refine the pick using domain expertise. The precision with which the signal onset is identified can have a large impact on downstream analyses. For long-distance events such as earthquakes, changing the pick time by a tenth of a second can move the estimated location by tens of kilometers, which can in turn impact the event's type classification and other characteristics (Ringdal and Husebye, 1982).

Although human seismologists currently provide the gold standard for accuracy and precision, human error is a known problem in determining arrival times. Depending on experience level and training procedures, some analysts pick arrival times earlier than others. Zeiler and Velasco (2009) did extensive studies on analysts' picks and found that not only do determinations vary among analysts, but also within a single analyst when presented with the same data multiple times.

The data science goal is therefore to extract arrival time information from the data in an effort to reduce the frequency and extent of disagreement among analysts. In this specification, data-driven uncertainty quantification methods are described to extract additional insights into likely onset times from the available seismic waveforms. Importantly, fully characterizing a distribution over onset times can also increase the statistical rigor of downstream analyses by opening the door to uncertainty propagation throughout the analytic sequence. The illustrative embodiments work within the existing seismic analysis framework using the same data that is already collected and employs non-parametric modeling techniques to avoid strong distributional assumptions.

This specification provides additional information on seismic waveform data and a review of existing analysis methods. This specification then describes our approach to estimating the seismic arrival times and associated uncertainty distribution. Next, the method is demonstrated using a subset of the SPEAR data initially studied by Zeiler and Velasco (2009). The description below includes a discussion of the decision-making implications of the statistical analysis presented herein, along with a discussion of how these ideas apply to other analysis tasks and of future work required to prepare these methods for practical applications.

2. Seismic Detection

Many events that occur on or within the Earth's crust can be identified by analyzing seismic waveforms.

Earthquakes (as in Trifunac and Brady, 1975), volcanic activity (as in Werner-Allen et al., 2005), explosions such as from mining operations (Stump and Pearson, 1996, for example), and ice events such as crevassing or iceberg calving (such as O'Neel et al., 2007) can all be detected, geolocated, and identified using seismograms. Analytic process details may differ from one application to another, but in general, the analysis proceeds in stages. Initial detection requires identifying precisely the onset of the signal, distinguishing it from background noise. A combination of multiple signals, typically from geospatially separate recording stations, are then used to determine a source location, which in turn helps to inform the event type classification and magnitude estimations.

Seismic arrival time picking is an issue general to geologic and seismic monitoring sensors. The raw data consists of a multichannel time series that measures ground motion, for example, in the x, y, and z directions. The time series may be perturbed by numerous sources, such as vehicle traffic, ocean waves, or wind in addition to phenomena of interest like earthquakes. Importantly, the perturbations can vary widely across measurement stations, with no two stations exhibiting the same characteristics.

Many error sources contribute to the uncertainty of a given arrival (Velasco et al., 2001), including the human errors described above. Measurement errors depend on external factors, such as the quality and location of the monitoring station, the strength of the source event, and the temporal properties of the signal, which may display a sudden (impulsive) onset or build slowly over time. Model errors refer to differences in predicted versus actual arrival times based on established models of wave propagation through the Earth's crust and interior. These errors tend to influence tasks such as source location and magnitude estimation, and we do not address them further in this work. One goal of the illustrative embodiments, therefore, is to reduce human error by rigorously assessing and reporting measurement errors.

The analysis task is to precisely identify the time at which background noise transitions to a seismic signal. Each channel is typically processed separately and standard practice includes preprocessing the data through bandpass filters, removing both high and low frequencies that experts believe to be irrelevant. Candidate arrivals are then identified in the filtered data, most commonly by computing the ratio of the short-term energy to the long-term energy (STA/LTA; see Rodriguez, 2011). A potential detection is identified when a predetermined threshold is exceeded for a specified number of channels (typically one). Output from the STA/LTA algorithm is a window containing the candidate arrival plus preceding noise and trailing noisy seismic waves.

FIG. 1 illustrates a graph showing a sliding window for estimating an arrival time of a signal in time series data, in accordance with an illustrative embodiment. Graph 100 is an example output from a seismograph. Vertical axis 102 shows the relative amplitude of a signal detected at the seismometer, and horizontal axis 104 shows increasing time. Graph 100 is an example of a noise-signal onset search window.

In many cases, the noise-signal onset search window is further refined to a specific onset time by using a combination of autoregressive models and a model fitting metric, such as the Akaike information criterion (AIC). Two separate models, $M_1$ 106 and $M_2$ 108, are fit to the noise and signal portions of the window respectively, as shown in FIG. 1. AIC (Akaike, 1974) is then used to optimize the onset time as the point at which the two models meet. Several variations on this procedure are described by Kamigaichi (1992). Importantly, the uncertainty of the onset time is typically described only by a confidence interval calculated as a function of the signal-to-noise ratio.

3. ESTIMATING ARRIVAL TIME

The following summarizes the techniques of the illustrative embodiments to refining the initial arrival time of the seismic signal. The illustrative embodiments are computationally efficient and rely on a well-founded theory in statistical time series analysis. Note that the basic procedure corresponds to standard practice for automatic pick refinement in the seismology community, as described above. The illustrative embodiments provide a complete "a posteriori" estimate of pick uncertainty.

3.1. Time Series Models

Assuming that $M_1$ 106 captures noise only, let each data point be an independent and identically distributed draw from a Normal probability distribution with zero mean and finite variance whose parameters are estimated from the data at each individual station. $M_1$ 106 is specified in the following:

$$Y_t \sim N(0, \sigma_n^2) \qquad (1)$$

Where $\sigma_n^2 < \infty$ for $t=1, \ldots k-1$ $M_2$ 108 models the generative process of the seismic signal. The sensor will record a noisy signal measurement, so the model explicitly includes both noise and signal components. We assume a smooth functional form to the signal apart from the noise. Weak signals will be followed by weak signals, and strong signal should immediately be followed by strong signals. This implies an auto-regressive, moving-average (ARMA) model for $M_2$ 108 with auto-regressive terms of order p and moving average terms of order q:

$$Y_t = c + \Sigma_{i=1}^p \phi_i Y_{t-i} + \Sigma_{i=1}^q \theta_i \in_{t-i} + \in_t \qquad (2)$$

Where $\in_t \sim N(0, \sigma_n^2)$ for $t=k, \ldots, T$, and $\sigma_n^2$ is the finite variance of the noise component of the signal model. The noise and signal distributions in Equations 1 and 2 provide likelihoods for our data which can be used to estimate both the arrival time and the associated uncertainty around it.

3.2. Information Theoretic Arrival Time Refinement

To refine the pick within the STA/LTA arrival time window requires evaluating the difference between models $M_1$ 106 and $M_2$ 108 and the observed statistics from our time series data. Model parameters are estimated from data in the onset search window. Following Kamigaichi (1992), the Akaike Information Criterion (AIC), a generalized entropy metric, is used to measure the differences between these specified prediction models and the observed time-series data. The general form for AIC is:

$$AIC(M) = -2 \log L(M) = -2\rho(M) \qquad (3)$$

Where $L(M)$ is the log-likelihood of model M, and $\rho(M)$ is the complexity of the model (e.g. degrees of freedom).

3.2.1. Additive Log-Likelihood of Noise-to-Signal Time Series

Suppose T data points are observed on a seismic sensor, $Y_t$, for $t=1, \ldots, T$. Assume that there exists a time point, $\alpha \in \{t : t=1, \ldots, T\}$, such that for all time points $t \le \alpha$ only noise is recorded. For all time points t after $\alpha$, $\alpha < t \le T$ we observe both a seismic signal and a noise component. By independence, we have directly that:

$$f(Y_1, \ldots, Y_T | \theta_1, \theta_2) = f(Y_1, Y_k | \theta_1) f(Y_{k+1}, \ldots, Y_T | \theta_2) \qquad (4)$$

Therefore, to find the MLE of the arrival time pick, we need to find k that satisfies:

$$\underset{k}{\arg\max} \{l(\theta_1 | Y_1, \ldots, Y_k) + l(\theta_2 | Y_{k+1}, \ldots, Y_T)\} \qquad (5)$$

By the definitions of $M_1$ and $M_2$ in Equations 1 and 2, their log-likelihoods are $$l(\theta_1 | y_1, \ldots, y_k) = -\frac{k}{2}\ln(2\pi) - \frac{k}{2}\ln(\sigma_n^2) - \frac{1}{2\sigma_n^2}\sum_{t=1}^{k} y_t^2 \qquad (6)$$

$$l(\theta_1 | y_{k+1}, \ldots, y_T) = \qquad (7)$$
$$-\frac{T-k-p}{2}\ln(2\pi) - \frac{(T-k-p)}{2}\ln(\sigma_n^2) - \frac{1}{2\sigma_n^2}\sum_{t=k+p+1}^{T} \varepsilon_t^2$$

Where $\varepsilon_t = Y_t - c - \Sigma_{i=1}^p \phi_i Y_{t-i} - \Sigma_{j=1}^q \theta_j \varepsilon_{t-j} + \in_{t-j}$ for $t=p+1, P=2, \ldots, T$ and the following AIC criterion to minimize for the arrival time estimation results:

$$L(M) = l(\theta_1 | Y_1, \ldots, Y_k) + l(\theta_2 | Y_{k+1}, \ldots, Y_T) = \qquad (8)$$
$$-\frac{k}{2}\ln(2\pi) - \frac{k}{2}\ln(\sigma_n^2) - \frac{1}{2\sigma_n^2}\sum_{t=1}^{k} y_t^2 - -\frac{T-k-p}{2}\ln(2\pi) -$$
$$\frac{(T-k-p)}{2}\ln(\sigma_n^2) - \frac{1}{2\sigma_n^2}\sum_{t=k+p+1}^{T} \varepsilon_t^2$$

Figure 2:
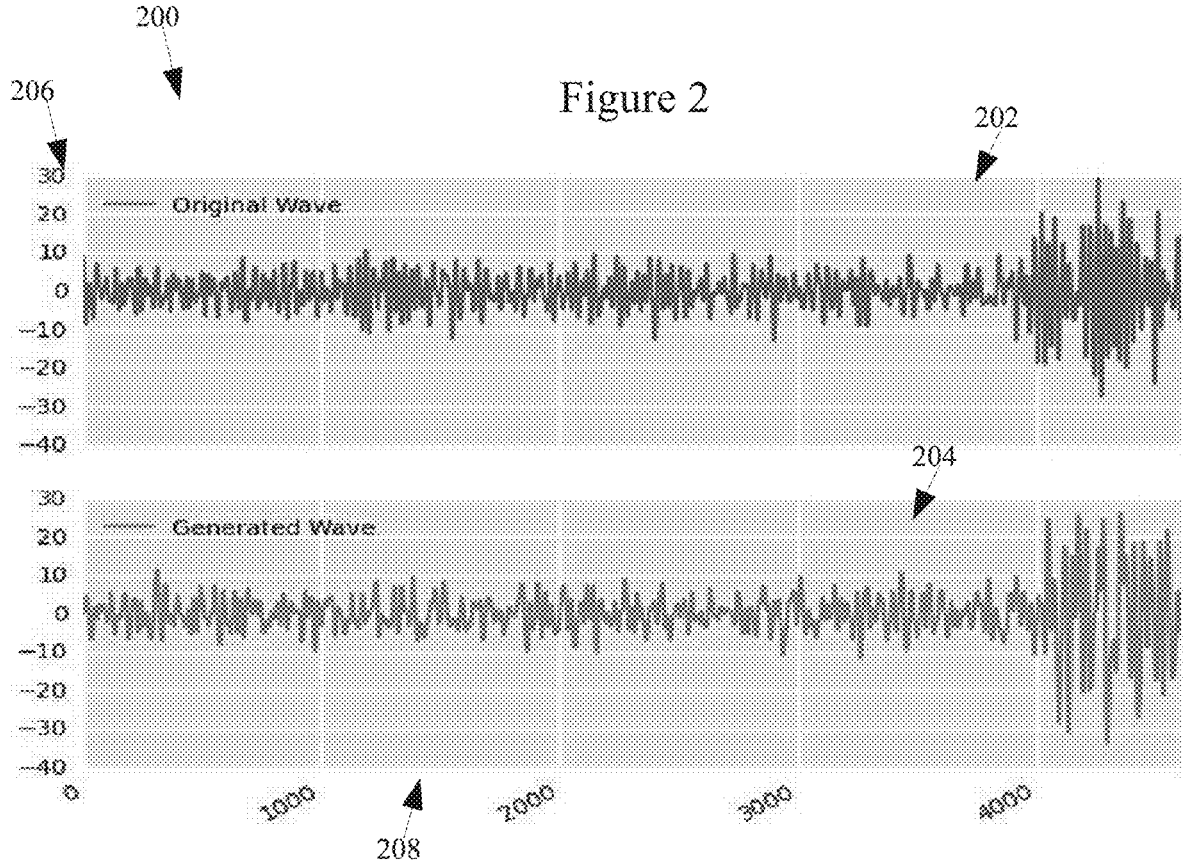
FIG. 2 illustrates graphs of onset search windows with samples drawn from a first model and a second model, in accordance with an illustrative embodiment.

FIG. 2 illustrates graphs of onset search windows with samples drawn from a first model and a second model, in accordance with an illustrative embodiment. Graphs 200 include graph 202 and graph 204. As with FIG. 1, graph 202 and graph 204 have vertical axis 206 representing relative amplitude of a signal received at a seismometer, and horizontal axis 208 representing time.

By specifying a model form for both the noise and signal time series, $M_1$ 106 and $M_2$ 108 provide a basis for using Monte Carlo sampling to derive an "a posteriori" distribution for the uncertainty of the onset time estimate. After fitting the models $M_1$ 106 and $M_2$ 108, as specified in Equations 1 and 2, the models can now be used to randomly generate a new time series.

Graph 202 of FIG. 2 shows an original seismic waveform while graph 204 shows data generated by random draws from $M_1$ 106 and $M_2$ 108, with the transition from 106 and $M_2$ 108 occurring at the identified onset point, k 110, shown in FIG. 1. Importantly, both the noise and signal models are specific to the observed data for a particular station, sensor, and channel. Note that the noise process can also follow a functional form that captures dependence when appropriate. This fact would not cause any change to the algorithm itself, apart from swapping the likelihood of the white noise model for the dependence-capturing model in the estimation.

Figure 3:
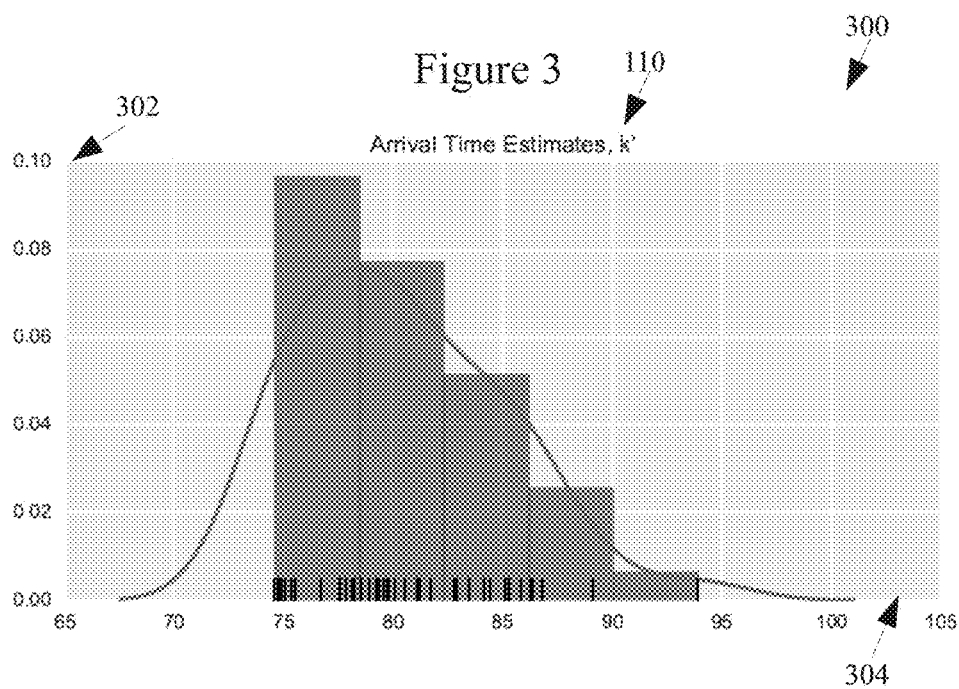
FIG. 3 illustrates a graph of a posterior density estimate of possible arrival times of a signal, in accordance with an illustrative embodiment.

FIG. 3 illustrates a graph of a posterior density estimate of possible arrival times of a signal, in accordance with an illustrative embodiment. Graph 300 is a graph of arrival time estimates k' 110 of FIG. 1, with vertical axis 302 representing a likelihood of an accurate onset time and horizontal axis 304 representing time.

To estimate an "a posteriori" distribution of the arrival time estimate, the illustrative embodiments now iterate. For each draw of the complete time series, the arrival time estimation algorithm is run, as detailed in Section 3, to get a new estimate, k̂, of the arrival time. As the two processes, noise and signal, become increasingly similar, the arrival time estimation algorithm yields more varied estimates and produce heavier tailed distributions. As the two processes diverge, less variation is seen in arrival time estimates, giving a tighter distribution. FIG. 3 shows a kernel density estimate (KDE) as an approximation of the complete arrival time posterior distribution for the data shown in FIG. 1.

Figure 4:
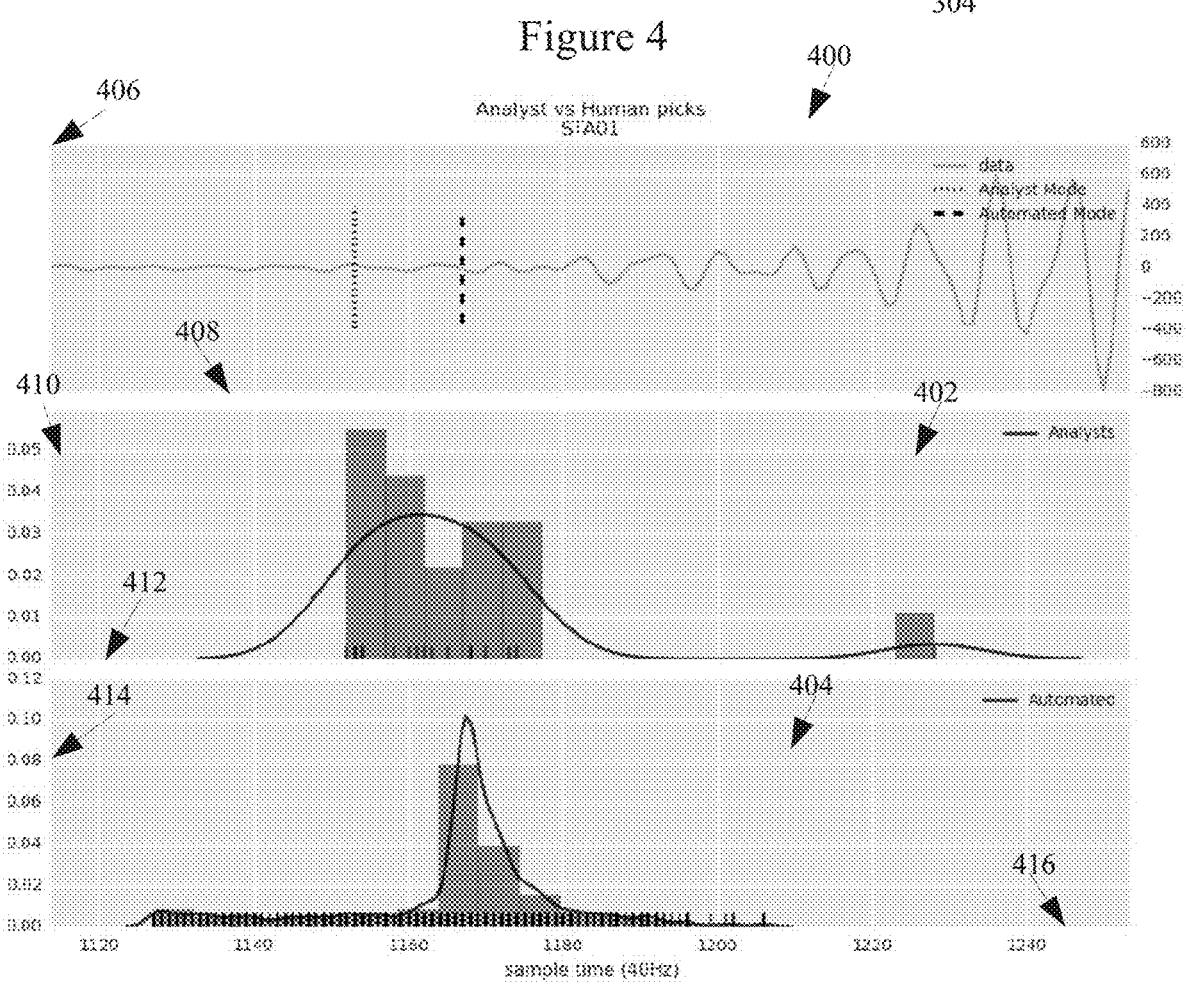
FIG. 4 illustrates a graph of a sample filtered waveform with pick distributions from different evaluators, in accordance with an illustrative embodiment.

FIG. 4 illustrates a graph of a sample filtered waveform with pick distributions from different evaluators, in accordance with an illustrative embodiment. To evaluate both the quality of automated picks selected by the illustrative embodiments and their decision making value, FIG. 4 provides a comparison of the output of the illustrative embodiments to picks made by human analysts using the data collected by Zeiler and Velasco (2009). Note that in the seismic domain, the complexity of the Earth's subsurface and its impact on wave propagation makes providing ground truth for real events almost impossible. Synthetic waveform generation is also a challenge as it requires highly detailed models, extensive computation, and still may not accurately reflect real-world conditions.

FIG. 4 shows the analysis results for one waveform. Three graphs are presented, graph 400, graph 402, and graph 404. Graph 400 shows the filtered waveform along with indicators for the mode of the analysts' picks (dotted line) and the mode of the automated picks (dashed line). In graph 400, vertical axis 406 represents amplitude and horizontal axis 408 represents time.

Graph 402 shows the distribution of picks selected by eighteen different human analysts. In graph 402, vertical axis 410 is the likelihood of an accurate onset time and horizontal axis 312 is the onset time.

Graph 404 shows the distribution created by one thousand picks. Like graph 402, in graph 404, vertical axis 414 is the likelihood of an accurate onset time and horizontal axis 416 is the onset time.

As can be seen by comparing graph 402 to graph 404, the means of the analyst and automated pick distributions were exactly the same, at sample time 1166, while the modes are separated by approximately 0.5 seconds. Thus, as can be seen, the illustrative embodiments are many times more accurate at determining the error distribution in determining the onset time of a signal from the seismograph.

Each waveform in the dataset had five to eighteen analysts with varying degrees of seismic background knowledge pick the arrivals of seismic events. For most waveforms, the filter excluded frequencies outside of the four to eight Hertz range. Search windows were then created, centered around the first arrival, as determined by STA/LTA, with varying window sizes depending on variability in the data (more variability requires a larger window). The waveforms were sampled at 40 Hz.

The illustrative embodiments used AIC to simultaneously determine the order parameters, p and q, for the ARMA models and the optimal value of k. For each set, p, q, and k, a maximum likelihood was used to determine the model parameters $\sigma_n^2$, $\sigma_s^2$, θ and Ø. The order parameters were universally small (p,q≤4).

Again, in summary, FIG. 4 shows the analysis results for one waveform. The top panel shows the filtered waveform along with indicators for the mode of the analysts' picks (dotted line) and the mode of the automated picks (dashed line). The middle panel shows the distribution created by eighteen analyst picks, and the bottom subplot shows the distribution created by one thousand automated picks. The means of the analysts' and automated pick distributions were exactly the same, at sample time 1166, while the modes are separated by approximately 0.5 seconds.

To understand the utility of the uncertainty distribution for decision-making, consider the following points. First, the disagreement among the eighteen analysts indicates that the initial change in the waveform is subtle in this case. Notice that the signal grows in strength gradually over the course of at least two seconds in eighty samples. The true onset may therefore be buried in the noise. The mode of the automated pick distribution corresponds to the statistically most likely point at which the waveform changed. From a purely statistical standpoint, an analyst that moves the onset determination away from this point may be unjustified, though again, domain expertise can trump statistics. In this case, the mode falls close to the mean of the analysts' picks, which is also the point that would be picked if the set of analysts were treated as an ensemble.

Note the minor mode in the automated distribution near sample time 1130. This small bump in probability indicates weak evidence that the onset may appear much earlier in the time series. Statistically, the true onset is unlikely to be near 1130, yet the result suggests that an analyst should examine the data in that area closely, to see if their domain expertise suggests a meaningful change in the data.

More generally, the distribution modes indicate points at which the statistical evidence suggests analysts should examine the data carefully. This fact may be viewed as a potentially important guideline that focus analysts' attention and lead toward greater agreement and uniformity among analysts' picks. As a simple example, consider whether the analyst that picked the onset on the far right, near 1225, might have reconsidered their selection if presented with such information. To be clear, the uncertainty distribution provides no definitive indication of the "correct" onset time. However, it does indicate the statistical likelihood of various possible solutions, and in this case, solutions near sample 1225 are very unlikely. Other waveform examples, not shown here for space considerations, show similar results.

Figure 5:
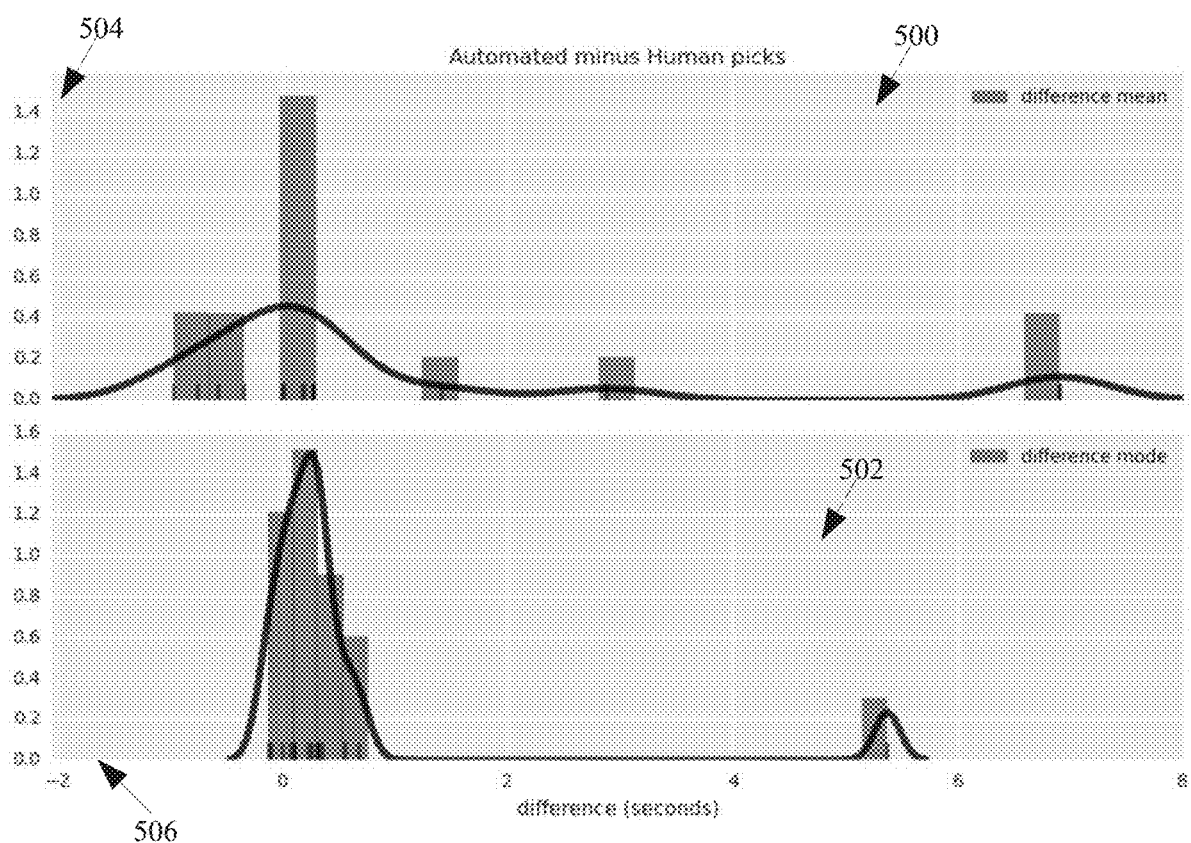
FIG. 5 illustrates a graph of histograms describing the difference between mean and mode pick times elected by human experts versus those selected the algorithm of the illustrative embodiments, in accordance with an illustrative embodiment.

FIG. 5 illustrates a graph of histograms describing the difference between the mean and mode pick times elected by human experts versus those selected the algorithm of the illustrative embodiments, in accordance with an illustrative embodiment. In FIG. 5, graph 500 and graph 502 are presented. Graph 500 represents the difference in the means, and graph 502 represents the difference in the modes. For both graphs, vertical axis 504 represents number of instances of the difference in the mean and mode pick times, and horizontal axis 506 represents the total of the difference between the relative values.

FIG. 5 shows a histogram of the difference between the means and modes of the analysts' and automated pick distributions. The results suggest that the two tend to be similar, although in some cases, they are very different. Interestingly, the modes tended to be more similar than the means, suggesting that the automated approach captured the consensus pick well, but showed different characteristics in variability. Note that a positive value in the difference of modes (graph 502) indicates that the analysts' tended to pick the onset earlier than the automated system. There tends to be more concern over picking onsets too late versus too early.

6. CONCLUSIONS

Statistical analysis can play a much larger role in data-driven decision making than it currently does. The illustrative embodiments have demonstrated how a rigorous analysis of the uncertainty in seismic arrival time estimates can provide valuable information to domain experts. The underlying lesson that uncertainty quantification can provide information not available from point estimates is general, and it applies to both other time series analysis problems, such as time series alignment and similarity, and to other data analysis problems, such as supervised and unsupervised classification.

Note that the illustrative embodiments effectively enhance a computer and advance the art. Prior to the illustrative embodiments, it was not possible to use a computer to estimate the uncertainty of an onset of a signal of interest in time-series noisy data. Even a human working with pen and paper, or perhaps aided by a computer, still would have to pick onset times using an "ad hoc" guess, rather than an "a posteriori" analysis as provided by the illustrative embodiments. Thus, the illustrative embodiments effectively provide the technical effect of enhancing a computer to determine uncertainties in onset times, as provided herein.

Figure 6:
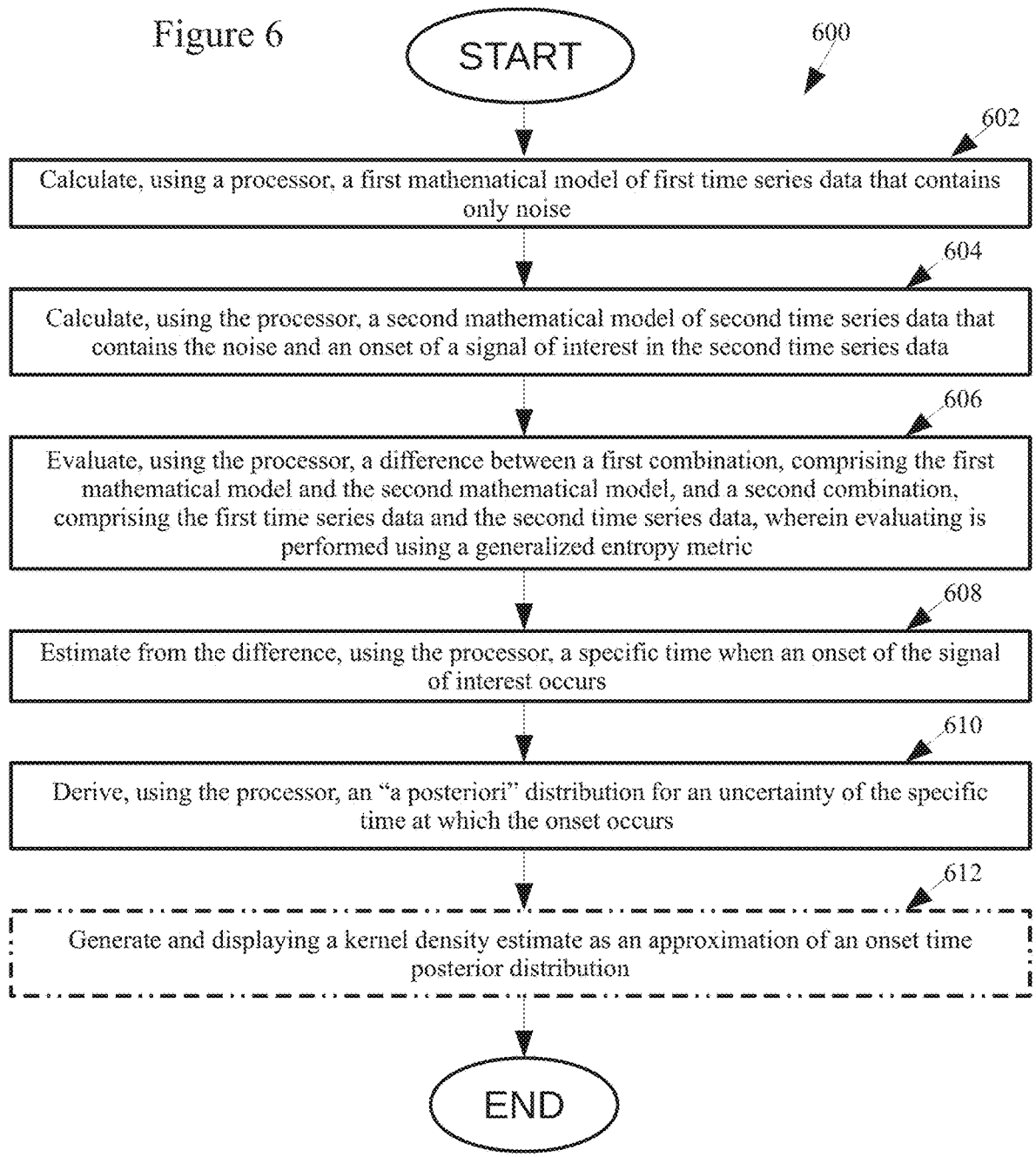
FIG. 6 illustrates a flowchart of a computer-implemented method of enhancing a computer to estimate an uncertainty of an onset of a signal of interest in time-series noisy data, in accordance with an illustrative embodiment.

FIG. 6 illustrates a flowchart of a computer-implemented method of enhancing a computer to estimate an uncertainty of an onset of a signal of interest in time-series noisy data, in accordance with an illustrative embodiment. Method 600 may be implemented using the techniques described above. Method 600 is solely suitable for enhancing a computer to estimate the uncertainty of the onset of the signal, and thus is implemented in a data processing system, such as data processing system 700 of FIG. 7.

Again, method 600 may be characterized as a computer-implemented method of enhancing a computer to estimate an uncertainty of an onset of a signal of interest in time-series noisy data. Method 600 includes calculating, using a processor, a first mathematical model of first time series data that contains only noise (operation 602). Method 600 also includes calculating, using the processor, a second mathematical model of second time series data that contains the noise and an onset of a signal of interest in the second time series data (operation 604).

Method 600 also includes evaluating, using the processor, a difference between a first combination, comprising the first mathematical model and the second mathematical model, and a second combination, comprising the first time series data and the second time series data, wherein evaluating is performed using a generalized entropy metric (operation 606). Method 600 also includes estimating from the difference, using the processor, a specific time when an onset of the signal of interest occurs (operation 608).

Method 600 also includes deriving, using the processor, an "a posteriori" distribution for an uncertainty of the specific time at which the onset occurs (operation 610). In one illustrative embodiment, method 600 may terminate thereafter. However, method 600 may be varied.

For example, the generalized entropy metric may be an Akaike information criterion. However, other information criteria are possible. For example, other information criteria include a Bayesian information criterion, a Euclidean distance, a Hamming distance, the L1 norm, or any mathematical metric induced by a norm.

In another example, the specific time is estimated by finding a value that satisfies the Akaike information criterion for log likelihoods of the first mathematical model and the second mathematical model. Similar techniques may be used with respect to the above-listed additional information criteria.

In yet another example, the "a posteriori" distribution is derived using the first mathematical model, the second mathematical model, and Monte Carlo sampling. In this case, each sample of the Monte Carlo sampling repeats calculating the first mathematical model, calculating the second mathematical model, evaluating, and estimating. Additionally, in this case, method 600 may be extended to include generating and displaying a kernel density estimate as an approximation of an onset time posterior distribution (operation 612). Because this operation is optional, it is shown inside a dotted box in FIG. 6. In one illustrative embodiment, the method may terminate thereafter.

The illustrative embodiments may be yet further varied. In another example, the first time series data may be first data from a single seismic sensor; the second time series data may be second data from the single seismic sensor; the signal of interest may be a waveform induced by a seismic event in the Earth; and the specific time may be the onset of the seismic event.

In still another example, the first mathematical model is a Gaussian random noise model. Other models may be used for the first mathematical model, such as, but not limited to, Gaussian processes, auto-regressive models (i.e. AR(p)), auto-regressive moving average models (i.e. ARMA(p,q)), neural network models, deep neural network models, hidden Markov models, and random forest decision trees.

In yet another example, the second mathematical model is an auto-regressive moving average model. Other models may be used for the second mathematical model, such as, but not limited to Gaussian processes, auto-regressive models (i.e. AR(p)), auto-regressive moving average models (i.e. ARMA(p,q)), neural network models, deep neural network models, hidden Markov models, and random forest decision trees.

Still further variations are possible. Thus, the illustrative embodiments are not necessarily limited to the examples provided in FIG. 6, and do not necessarily limit the claimed inventions.

Figure 7:
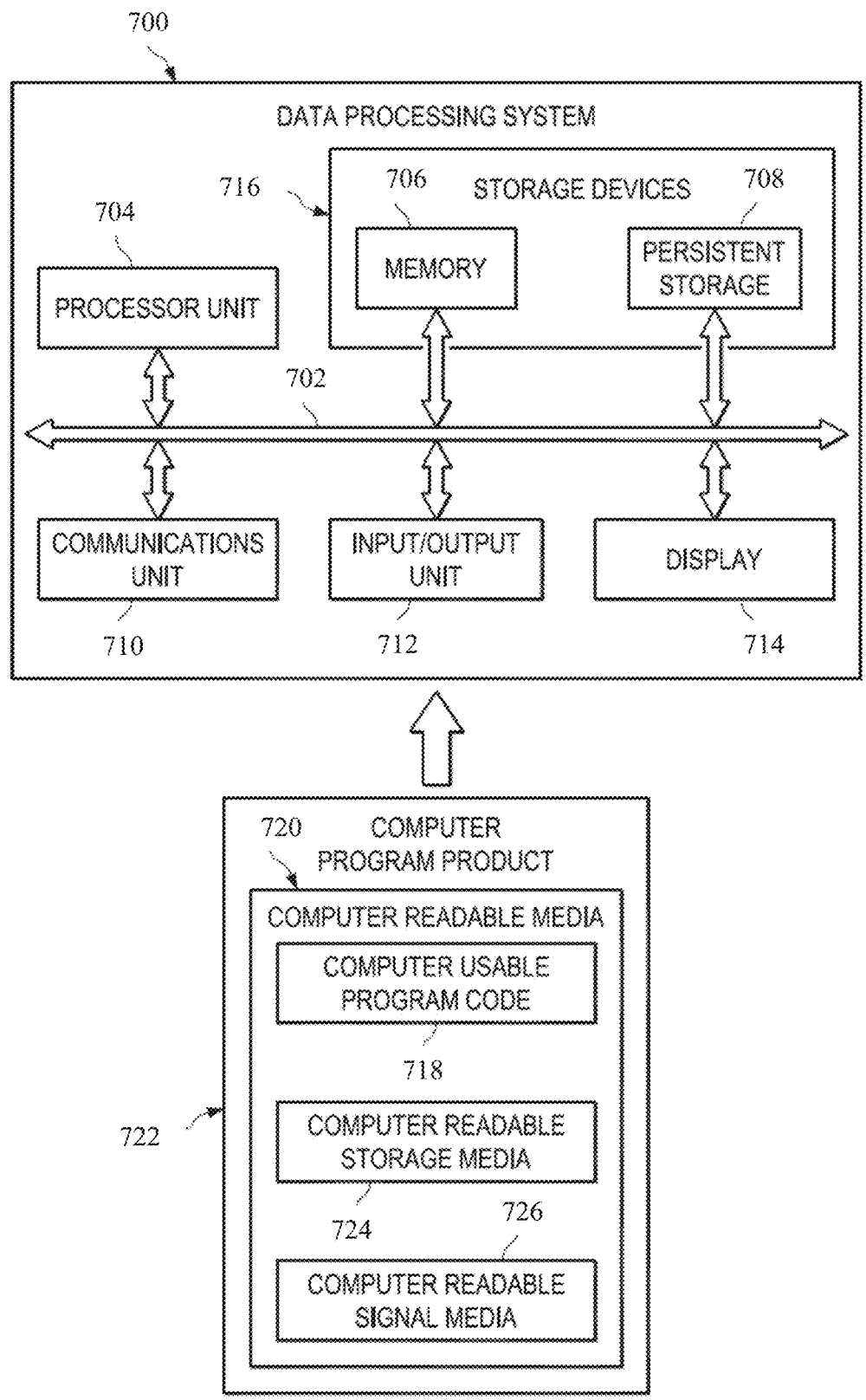
FIG. 7 illustrates a data processing system, in accordance with an illustrative embodiment.

Turning now to FIG. 7, an illustration of a data processing system is depicted in accordance with an illustrative embodiment. Data processing system 700 in FIG. 7 is an example of a data processing system that may be used to implement the illustrative embodiments, such as those described with respect to FIG. 1 through FIG. 20. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. This software may be an associative memory, content addressable memory, or software for implementing the processes described elsewhere herein. Thus, for example, software loaded into memory 706 may be software for executing graph 100 of FIG. 1 or method 600 of FIG. 6.

Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718.

With this depicted example, some of the processes may be implemented in the number of hardware units, while other processes may be implemented in the number of processors.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 702.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

REFERENCES

Akaike, H. (1974). A new look at statistical model identification, IEEE Transactions on Automatic Control 19, 6, pp. 716-723.

Kamigaichi, O. (1992). A fully automated method for determining the arrival times of seismic waves and its application to an on-line processing system, in Proceedings 34th GSE session, GSE/RF/62, G.S.E., Geneva, Italy.

O'Neel, S., Marshall, H., McNamara, D. and Pfe er, W. T. (2007). Seismic detection and analysis of icequakes at Columbia glacier, Alaska, Journal of Geophysical Research 112.

Ringdal, F. and Husebye, E. (1982). Application of arrays in the detection, location, and identification of seismic events, Bulletin of the Seismological Society of America 72, 6B, pp. S201-S224.

Rodriguez, I. V. (2011). Automatic time-picking of microseismic data combining sta/lta and the stationary discrete wavelet transform, in CSPG CSEG CWLS Convention, convention abstracts.

Stump, B. W. and Pearson, D. C. (1996). Regional observations of mining blasts by the GSETT-3 seismic monitoring system, Tech. Rep. LA-UR-96-3634, Los Alamos National Laboratories.

Trifunac, M. D. and Brady, A. G. (1975). A study on the duration of strong earthquake ground motion, Bulletin of the Seismological Society of America 65, 3, pp. 581-626.

Velasco, A., Young, C. and Anderson, D. (2001). Uncertainty in phase arrival time picks for regional seismic events: an experimental design, Tech. rep., Tech. rep., US Department of Energy.

Werner-Allen, G., Johnson, J., Ruiz, M., Lees, J. and Welsh, M. (2005). Monitoring volcanic eruptions with a wireless sensor network, in Proceedings of the Second European Workshop on Wireless Sensor Networks, 2005., pp. 108-120.

Zeiler, C. and Velasco, A. A. (2009). Seismogram picking error from analyst review (SPEAR): Single-analyst and institution analysis, Bulletin of the Seismological Society of America 99, 5, pp. 2759-2770.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of enhancing a computer to estimate an uncertainty of an onset of a signal of interest in time-series noisy data, the computer-implemented method comprising:
calculating, using a processor, a first mathematical model of first time series data that contains only noise;
calculating, using the processor, a second mathematical model of second time series data that contains noise and an onset of a signal of interest in the second time series data;
evaluating, using the processor, a difference between a first combination, comprising the first mathematical model and the second mathematical model, and a second combination, comprising the first time series data and the second time series data, wherein evaluating is performed using a generalized entropy metric;
estimating from the difference, using the processor, a specific time when an onset of the signal of interest occurs; and
deriving, using the processor, an "a posteriori" distribution for an uncertainty of the specific time at which the onset occurs.

2. The computer-implemented method of claim 1, wherein the generalized entropy metric comprises an Akaike information criterion.

3. The computer-implemented method of claim 2, wherein the specific time is estimated by finding a value that satisfies the Akaike information criterion for log likelihoods of the first mathematical model and the second mathematical model.

4. The computer-implemented method of claim 1, wherein the "a posteriori" distribution is derived using the first mathematical model, the second mathematical model, and Monte Carlo sampling.

5. The computer-implemented method of claim 4, wherein each sample of the Monte Carlo sampling repeats calculating the first mathematical model, calculating the second mathematical model, evaluating, and estimating.

6. The computer-implemented method of claim 4 further comprising:
generating and displaying a kernel density estimate as an approximation of an onset time posterior distribution.

7. The computer-implemented method of claim 1, wherein:
the first time series data comprises first data from a single seismic sensor;
the second time series data comprises second data from the single seismic sensor;
the signal of interest comprises a waveform induced by a seismic event in the Earth; and
the specific time comprises the onset of the seismic event.

8. The computer-implemented method of claim 1, wherein the first mathematical model is a Gaussian random noise model.

9. The computer-implemented method of claim 1, wherein the second mathematical model is an auto-regressive moving average model.

10. A computer comprising:
a processor;
a non-transitory computer recordable storage medium connected to the processor and storing program code which, when executed by the processor, performs a computer-implemented method of enhancing a computer to estimate an uncertainty of an onset of a signal of interest in time-series noisy data, the program code comprising:
program code for calculating, using a processor, a first mathematical model of first time series data that contains only noise;
program code for calculating, using the processor, a second mathematical model of second time series data that contains noise and an onset of a signal of interest in the second time series data;
program code for evaluating, using the processor, a difference between a first combination, comprising the first mathematical model and the second mathematical model, and a second combination, comprising the first time series data and the second time series data, wherein evaluating is performed using a generalized entropy metric;
program code for estimating from the difference, using the processor, a specific time when an onset of the signal of interest occurs; and
program code for deriving, using the processor, an "a posteriori" distribution for an uncertainty of the specific time at which the onset occurs.

11. The computer of claim 10, wherein the generalized entropy metric comprises an Akaike information criterion.

12. The computer of claim 11, wherein the specific time is estimated using the program code by finding a value that satisfies the Akaike information criterion for log likelihoods of the first mathematical model and the second mathematical model.

13. The computer of claim 10, wherein the "a posteriori" distribution is derived using the program code by using the first mathematical model, the second mathematical model, and Monte Carlo sampling.

14. The computer of claim 13 further comprising:
program code for generating and displaying a kernel density estimate as an approximation of an onset time posterior distribution.

15. The computer of claim 10, wherein:
program code for the first time series data comprises first data from a single seismic sensor;
program code for the second time series data comprises second data from the single seismic sensor;
program code for the signal of interest comprises a waveform induced by a seismic event in the Earth; and
program code for the specific time comprises the onset of the seismic event.

16. The computer of claim 10, wherein the first mathematical model is a Gaussian random noise model.

17. The computer of claim 10, wherein the second mathematical model is an auto-regressive moving average model.

18. A non-transitory computer recordable storage medium connected to a processor and storing program code which, when executed by the processor, performs a computer-implemented method of enhancing a computer to estimate an uncertainty of an onset of a signal of interest in time-series noisy data, the program code comprising:
program code for calculating, using a processor, a first mathematical model of first time series data that contains only noise;
program code for calculating, using the processor, a second mathematical model of second time series data that contains noise and an onset of a signal of interest in the second time series data;
program code for evaluating, using the processor, a difference between a first combination, comprising the first mathematical model and the second mathematical model, and a second combination, comprising the first time series data and the second time series data, wherein evaluating is performed using a generalized entropy metric;

program code for estimating from the difference, using the processor, a specific time when an onset of the signal of interest occurs; and program code for deriving, using the processor, an "a posteriori" distribution for an uncertainty of the specific time at which the onset occurs.

19. The non-transitory computer recordable storage medium of claim 18, wherein the generalized entropy metric comprises an Akaike information criterion, and wherein the specific time is estimated using the program code by finding a value that satisfies the Akaike information criterion for log likelihoods of the first mathematical model and the second mathematical model.

20. The non-transitory computer recordable storage medium of claim 18, wherein the "a posteriori" distribution is derived using the program code by using the first mathematical model, the second mathematical model, and Monte Carlo sampling, and wherein the program code further comprises:

program code for generating and displaying a kernel density estimate as an approximation of an onset time posterior distribution.

* * * * *